(12) United States Patent
Kato et al.

(10) Patent No.: US 11,397,035 B2
(45) Date of Patent: Jul. 26, 2022

(54) CONTROLLER OF AIR CONDITIONING APPARATUS, OUTDOOR UNIT, RELAY UNIT, HEAT SOURCE UNIT, AND AIR CONDITIONING APPARATUS

(71) Applicant: Mitsubishi Electric Corporation, Tokyo (JP)

(72) Inventors: Naoki Kato, Tokyo (JP); Yuji Motomura, Tokyo (JP); Naofumi Takenaka, Tokyo (JP); Kimitaka Kadowaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 81 days.

(21) Appl. No.: 17/057,194

(22) PCT Filed: Jul. 20, 2018

(86) PCT No.: PCT/JP2018/027307
§ 371 (c)(1),
(2) Date: Nov. 20, 2020

(87) PCT Pub. No.: WO2020/017030
PCT Pub. Date: Jan. 23, 2020

(65) Prior Publication Data
US 2021/0207859 A1    Jul. 8, 2021

(51) Int. Cl.
*F25B 49/02* (2006.01)
*F25B 13/00* (2006.01)
*F25B 47/02* (2006.01)

(52) U.S. Cl.
CPC .............. *F25B 49/02* (2013.01); *F25B 13/00* (2013.01); *F25B 47/02* (2013.01);
(Continued)

(58) Field of Classification Search
CPC ........ F25B 2313/003; F25B 2313/0233; F25B 2600/11; F25B 2600/2515; F25B 25/005; F25B 47/02; F25B 47/025
See application file for complete search history.

(56) References Cited

U.S. PATENT DOCUMENTS

| 2011/0185756 A1* | 8/2011 | Yamashita | .............. F25B 13/00 62/171 |
| 2012/0304675 A1* | 12/2012 | Motomura | ................ F24F 3/06 62/156 |

(Continued)

FOREIGN PATENT DOCUMENTS

| EP | 2940407 A1 | 11/2015 |
| JP | 2009-041860 A | 2/2009 |

(Continued)

OTHER PUBLICATIONS

International Search Report of the International Searching Authority dated Oct. 16, 2018 for the corresponding International application No. PCT/JP2018/027307 (and English translation).

*Primary Examiner* — Henry T Crenshaw
(74) *Attorney, Agent, or Firm* — Posz Law Group, PLC

(57) ABSTRACT

An air conditioning apparatus includes, a first heat exchanger, a second heat exchanger configured to exchange heat between a first heat medium and a second heat medium, flow rate control valves, and a pump. In a heating mode, a controller is configured to open the flow rate control valve corresponding to a heat exchanger, of the third heat exchangers, to which a request for air conditioning has been made, and to close the flow rate control valve(s) corresponding to a heat exchanger(s), of the third heat exchangers, to which the request for air conditioning has not been made. In a defrosting mode, when a temperature of the second heat medium is lower than a first determination temperature, the controller is configured to open at least one of the flow rate (Continued)

control valve(s) corresponding to the heat exchanger(s) to which the request for air conditioning has not been made.

12 Claims, 13 Drawing Sheets

(52) U.S. Cl.
CPC ... *F25B 2600/11* (2013.01); *F25B 2600/2515* (2013.01); *F25B 2700/2103* (2013.01)

(56) References Cited

U.S. PATENT DOCUMENTS

| | | | |
|---|---|---|---|
| 2014/0182320 A1* | 7/2014 | Hatomura | F25D 21/06 |
| | | | 62/278 |
| 2015/0369498 A1* | 12/2015 | Motomura | F24F 3/065 |
| | | | 62/160 |
| 2021/0033324 A1* | 2/2021 | Hayashida | F25B 13/00 |
| 2022/0082283 A1* | 3/2022 | Kato | F24F 11/42 |
| 2022/0090812 A1* | 3/2022 | Kato | F24F 11/62 |

FOREIGN PATENT DOCUMENTS

| | | |
|---|---|---|
| WO | 2013/008278 A1 | 1/2013 |
| WO | 2014/102934 A1 | 7/2014 |

* cited by examiner

<DURING HEATING OPERATION>

<DURING HEATING-DEFROSTING (STATE A)>

<DURING HEATING-DEFROSTING (STATE B)>

CONTROLLER OF AIR CONDITIONING APPARATUS, OUTDOOR UNIT, RELAY UNIT, HEAT SOURCE UNIT, AND AIR CONDITIONING APPARATUS

CROSS REFERENCE TO RELATED APPLICATION

This application is a U.S. national stage application of International Application No. PCT/JP2018/027307 filed on Jul. 20, 2018, the contents of which are incorporated herein by reference.

TECHNICAL FIELD

The present disclosure relates to a controller of an air conditioning apparatus, an outdoor unit, a relay unit, a heat source unit, and an air conditioning apparatus.

BACKGROUND ART

Conventionally, an indirect air conditioning apparatus is known that generates hot and/or cold water by a heat source unit such as a heat pump, and delivers the water to an indoor unit through a water pump and a pipe to perform heating and/or cooling in the interior of a room.

Such an indirect air conditioning apparatus employs water or brine as a use-side heat medium, and thus has been receiving increasing attention in recent years in order to reduce refrigerant usage.

In Japanese Patent Laying-Open No. 2009-41860, when a water heat exchanger for generating hot and/or cold water is likely to freeze, a bypass circuit is opened and an expansion valve is closed, causing low-temperature refrigerant during defrosting to bypass, and not to flow into, the water heat exchanger, to prevent the freezing of the water heat exchanger.

CITATION LIST

Patent Literature

PTL 1: Japanese Patent Laying-Open No. 2009-41860

SUMMARY OF INVENTION

Technical Problem

In a configuration that prevents refrigerant from flowing through a water heat exchanger acting as an evaporator during defrosting by means of a bypass circuit, as in Japanese Patent Laying-Open No. 2009-41860, heat absorption from water to the refrigerant at the water heat exchanger does not take place, resulting in a longer defrosting time. This causes a longer interruption time of heating and thus reduces room temperature, possibly resulting in compromised comfort.

The present disclosure has been made to solve the problem described above, and has an object to provide a controller, of an indirect air conditioning apparatus using a heat medium such as water or brine, which is capable of ensuring heat absorption from the heat medium while preventing freezing of the heat medium, to shorten a length of time required for defrosting operation.

Solution to Problem

A controller of the present disclosure is a controller to control an air conditioning apparatus configured to operate in operation modes including a heating mode and a defrosting mode. The air conditioning apparatus includes: a compressor configured to compress a first heat medium; a first heat exchanger configured to exchange heat between the first heat medium and outdoor air; a second heat exchanger configured to exchange heat between the first heat medium and a second heat medium; a plurality of third heat exchangers each configured to exchange heat between the second heat medium and indoor air; a plurality of flow rate control valves each configured to control a flow rate of the second heat medium flowing through a corresponding one of the plurality of third heat exchangers; and a pump configured to circulate the second heat medium between the plurality of third heat exchangers and the second heat exchanger. In the heating mode, the controller is configured to open the flow rate control valve corresponding to a heat exchanger, of the plurality of third heat exchangers, to which a request for air conditioning has been made, and to close the flow rate control valve corresponding to a heat exchanger, of the plurality of third heat exchangers, to which the request for air conditioning has not been made. In the defrosting mode, when a temperature of the second heat medium is lower than a first determination temperature, the controller is configured to open at least one of the flow rate control valves corresponding to the heat exchangers to which the request for air conditioning has not been made.

Advantageous Effects of Invention

According to the controller of the present disclosure, a defrosting time of the air conditioning apparatus is shortened, and accordingly, comfort during air conditioning is improved.

DESCRIPTION OF EMBODIMENTS

Figure 1:
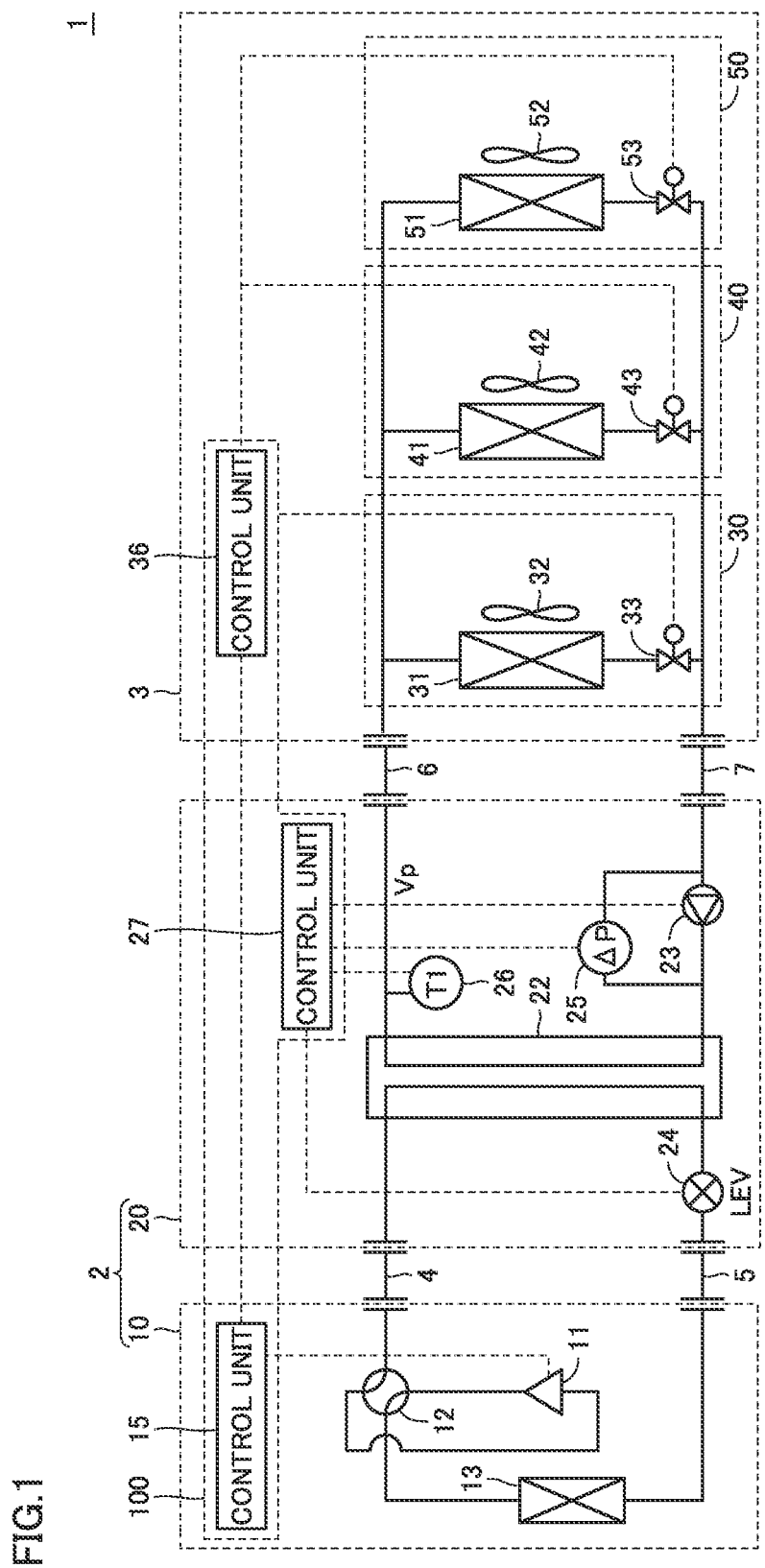
FIG. 1 shows the configuration of an air conditioning apparatus according to a first embodiment.

In the following, embodiments of the present disclosure will be described in detail with reference to the drawings. While a plurality of embodiments are described below, it has been intended from the time of filing of the present application to appropriately combine configurations described in the respective embodiments. Note that the same or corresponding elements are designated by the same symbols in the drawings and will not be described repeatedly.

First Embodiment

FIG. 1 shows the configuration of an air conditioning apparatus according to a first embodiment. Referring to FIG. 1, an air conditioning apparatus 1 includes a heat source unit 2, an indoor air conditioning device 3, and a controller 100. Heat source unit 2 includes an outdoor unit 10 and a relay unit 20. In the following description, a first heat medium can be exemplified by refrigerant, and a second heat medium can be exemplified by water or brine.

Outdoor unit 10 includes part of a refrigeration cycle that operates as a heat source or a cold source for the first heat medium. Outdoor unit 10 includes a compressor 11, a four-way valve 12, and a first heat exchanger 13. FIG. 1 shows an example where four-way valve 12 performs cooling or defrosting, with heat source unit 2 serving as a cold source. When four-way valve 12 is switched to reverse the direction of circulation of the refrigerant, heating is performed, with heat source unit 2 serving as a heat source.

Relay unit 20 includes a second heat exchanger 22, a pump 23 for circulating the second heat medium between the second heat exchanger and indoor air conditioning device 3, an expansion valve 24, a pressure sensor 25 for detecting a differential pressure ΔP before and after pump 23, and a temperature sensor 26 for measuring a temperature of the second heat medium that has passed through second heat exchanger 22. Second heat exchanger 22 exchanges heat between the first heat medium and the second heat medium. A plate heat exchanger can be used as second heat exchanger 22.

Outdoor unit 10 and relay unit 20 are connected to each other by pipes 4 and 5 for flowing the first heat medium. Compressor 11, four-way valve 12, first heat exchanger 13, expansion valve 24, and second heat exchanger 22 form a first heat medium circuit which is a refrigeration cycle using the first heat medium. Note that outdoor unit 10 and relay unit 20 may be integrated together in heat source unit 2. If they are integrated together, pipes 4 and 5 are accommodated in a casing.

indoor air conditioning device 3 and relay unit 20 are connected to each other by pipes 6 and 7 for flowing the second heat medium. Indoor air conditioning device 3 includes an indoor unit 30, an indoor unit 40 and an indoor unit 50. Indoor units 30, 40 and 50 are connected in parallel with one another between pipe 6 and pipe 7.

Indoor unit 30 includes a heat exchanger 31, a fan 32 for delivering indoor air to heat exchanger 31, and a flow rate control valve 33 for controlling a flow rate of the second heat medium. Heat exchanger 31 exchanges heat between the second heat medium and the indoor air.

Indoor unit 40 includes a heat exchanger 41, a fan 42 for delivering indoor air to heat exchanger 41, and a flow rate control valve 43 for controlling a flow rate of the second heat medium. Heat exchanger 41 exchanges heat between the second heat medium and the indoor air.

Indoor unit 50 includes a heat exchanger 51, a fan 52 for delivering indoor air to heat exchanger 51, and a flow rate control valve 53 for controlling a flow rate of the second heat medium. Heat exchanger 51 exchanges heat between the second heat medium and the indoor air.

Note that pump 23, second heat exchanger 22, and parallel-connected heat exchanger 31, heat exchanger 41 and heat exchanger 51 form a second heat medium circuit using the second heat medium. While an air conditioning apparatus having three indoor units is illustrated by way of example in the present embodiment, any number of indoor units may be provided.

Control units 15, 27 and 36 distributed across outdoor unit 10, relay unit 20 and indoor air conditioning device 3 cooperate with one another to operate as controller 100. Controller 100 controls compressor 11, expansion valve 24, pump 23, flow rate control valves 33, 43, 53, and fans 32, 42, 52 in response to outputs from pressure sensor 25 and temperature sensor 26.

Note that one of control units 15, 27 and 36 may serve as a controller, and control compressor 11, expansion valve 24, pump 23, flow rate control valves 33, 43, 53, and fans 32, 42, 52 based on data detected by the other control units 15, 27 and 36. Note that if heat source unit 2 has outdoor unit 10 and relay unit 20 that are integrated together, control units 15 and 27 may cooperate with each other to operate as a controller based on data detected by control unit 36.

In the configuration of FIG. 1, air conditioning apparatus 1 determines, using temperature sensor 26, whether or not the second heat medium is likely to freeze. When the second heat medium is likely to freeze during defrosting, the flow rate control valves are opened and the fans are rotated in the indoor units to introduce heat from the indoor air into the second heat medium, to prevent the freezing. This freezing-preventing operation will be sequentially described below.

Figure 2:
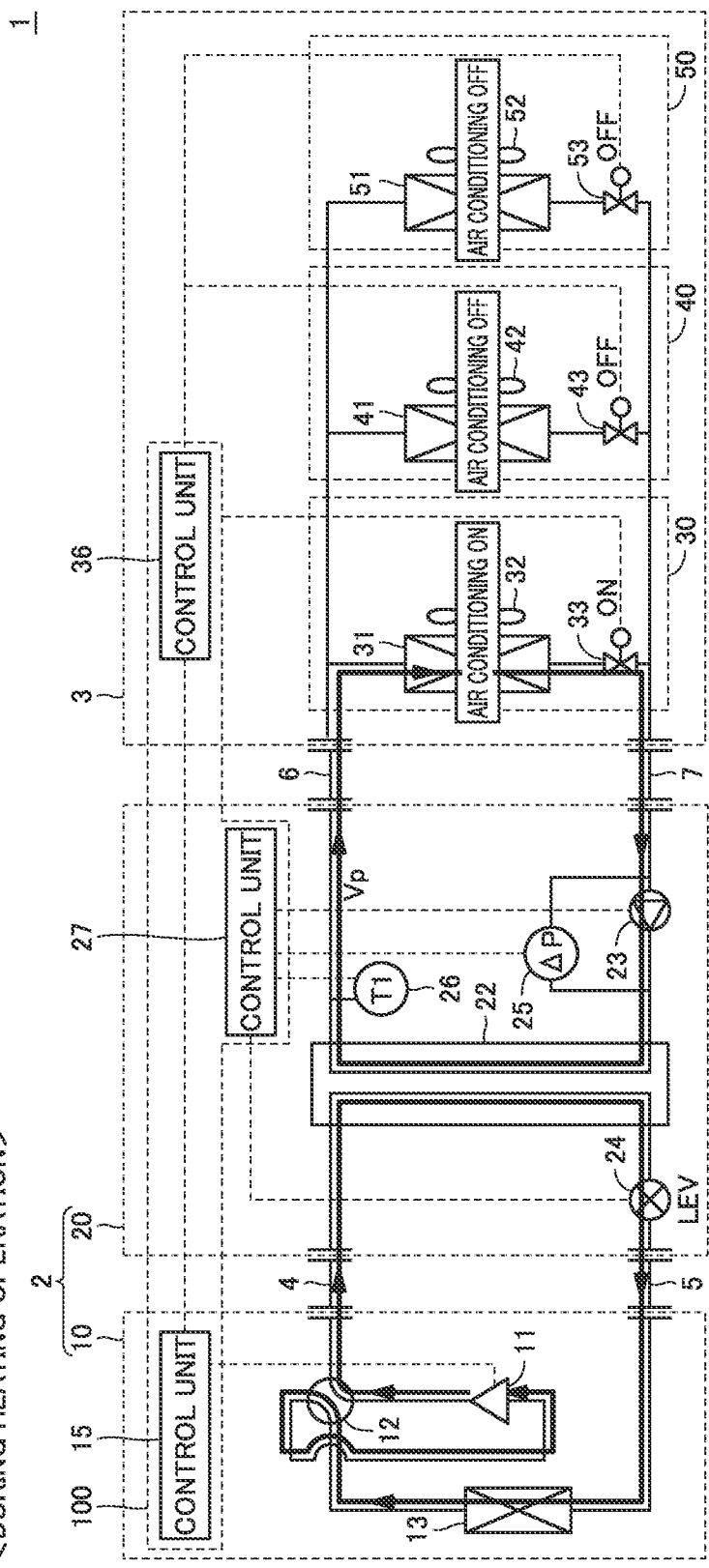
FIG. 2 shows flows of a first heat medium and a second heat medium during heating operation.

For ease of explanation, an example where indoor units 40 and 50 are in a stopped state and only indoor unit 30 is performing heating operation is initially described. FIG. 2 shows flows of the first heat medium and the second heat medium during the heating operation. In FIG. 2, indoor unit 30 is described as being in an air-conditioning ON state, and indoor units 40 and 50 are described as being in an air-conditioning OFF state. Note that the air-conditioning ON state indicates that a request for air conditioning has been made to the indoor unit, and the air-conditioning OFF state indicates that the request for air conditioning has not been made to the indoor unit. The air-conditioning OFF state includes a situation where the indoor unit has been turned off by a remote controller or the like, and also a situation where room temperature has reached a set temperature because air conditioning was performed by the indoor unit in the air-conditioning ON state, and the air conditioning is being suspended.

During the heating operation, four-way valve 12 is set such that the first heat medium (refrigerant) is discharged from compressor 11, passes successively through second heat exchanger 22, expansion valve 24 and first heat exchanger 13, and returns to compressor 11. The high-temperature and high-pressure first heat medium discharged from compressor 11 exchanges heat with the second heat medium at second heat exchanger 22 and is thereby condensed. The condensed first heat medium is decompressed by expansion valve 24, evaporates into a low-temperature gaseous state at first heat exchanger 13, and returns to compressor 11.

In the second heat medium circuit, the second heat medium (water or brine) delivered from pump 23 exchanges heat with the first heat medium at second heat exchanger 22 and thereby increases in temperature. The second heat medium having the increased temperature is supplied to indoor unit 30 in the air-conditioning ON state, and exchanges heat with the indoor air. Indoor unit 30 in the air-conditioning ON state thereby supplies hot air into the room. Note that flow rate control valve 33 corresponding to indoor unit 30 in the air-conditioning ON state is controlled to be in an open state, and flow rate control valves 43 and 53 corresponding to indoor units 40 and 50 in the air-conditioning OFF state are controlled to be in a closed state. Thus, the second heat medium flows through heat exchanger 31, but does not flow through heat exchangers 41 and 51.

Figure 3:
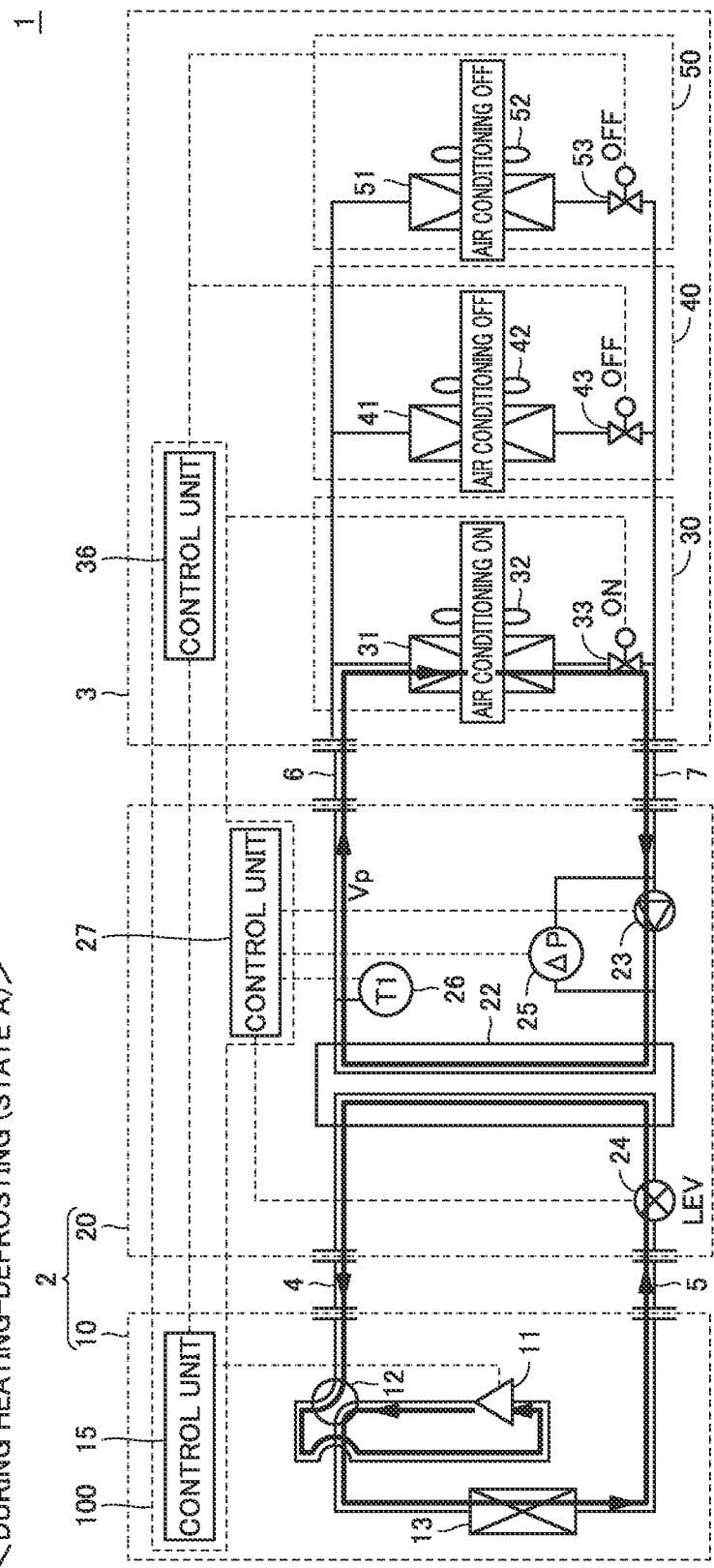
FIG. 3 shows flows of the first heat medium and the second heat medium in heating-defrosting operation (state A).

FIG. 3 shows flows of the first heat medium and the second heat medium in heating-defrosting operation (state A). The heating-defrosting operation (state A) is a standard state of heating-defrosting operation. Referring to FIG. 3, four-way valve 12 is set such that the first heat medium (refrigerant) is discharged from compressor 11, passes successively through first heat exchanger 13, expansion valve 24 and second heat exchanger 22, and returns to compressor 11. That is, four-way valve 12 is controlled to be in the same state as that in cooling operation. At this time, the high-temperature and high-pressure first heat medium discharged from compressor 11 exchanges heat with outdoor air at first heat exchanger 13 and is thereby condensed. The condensed first heat medium is decompressed by expansion valve 24, exchanges heat with the second heat medium and turns into a low-temperature gaseous state at second heat exchanger 22, and returns to compressor 11.

In the second heat medium circuit, the second heat medium (water or brine) delivered from pump 23 exchanges heat with the first heat medium at second heat exchanger 22 and thereby decreases in temperature. The second heat medium having the reduced temperature is supplied to indoor unit 30 in the air-conditioning ON state. However, fan 32 is in a stopped state, and therefore, cold air is not blown into the room. Note that flow rate control valve 33 corresponding to indoor unit 30 in the air-conditioning ON state is controlled to be in an open state, and flow rate control valves 43 and 53 corresponding to indoor units 40 and 50 in the air-conditioning OFF state are controlled to be in a closed state. Thus, the second heat medium flows through heat exchanger 31, but does not flow through heat exchangers 41 and 51.

At this time, at second heat exchanger 22, the second heat medium exchanges heat with the low-temperature first heat medium and is thereby cooled. Note that when the temperature of the second heat medium at a flow-in portion of second heat exchanger 22 is low, the second heat medium is likely to freeze within second heat exchanger 22.

Figure 4:
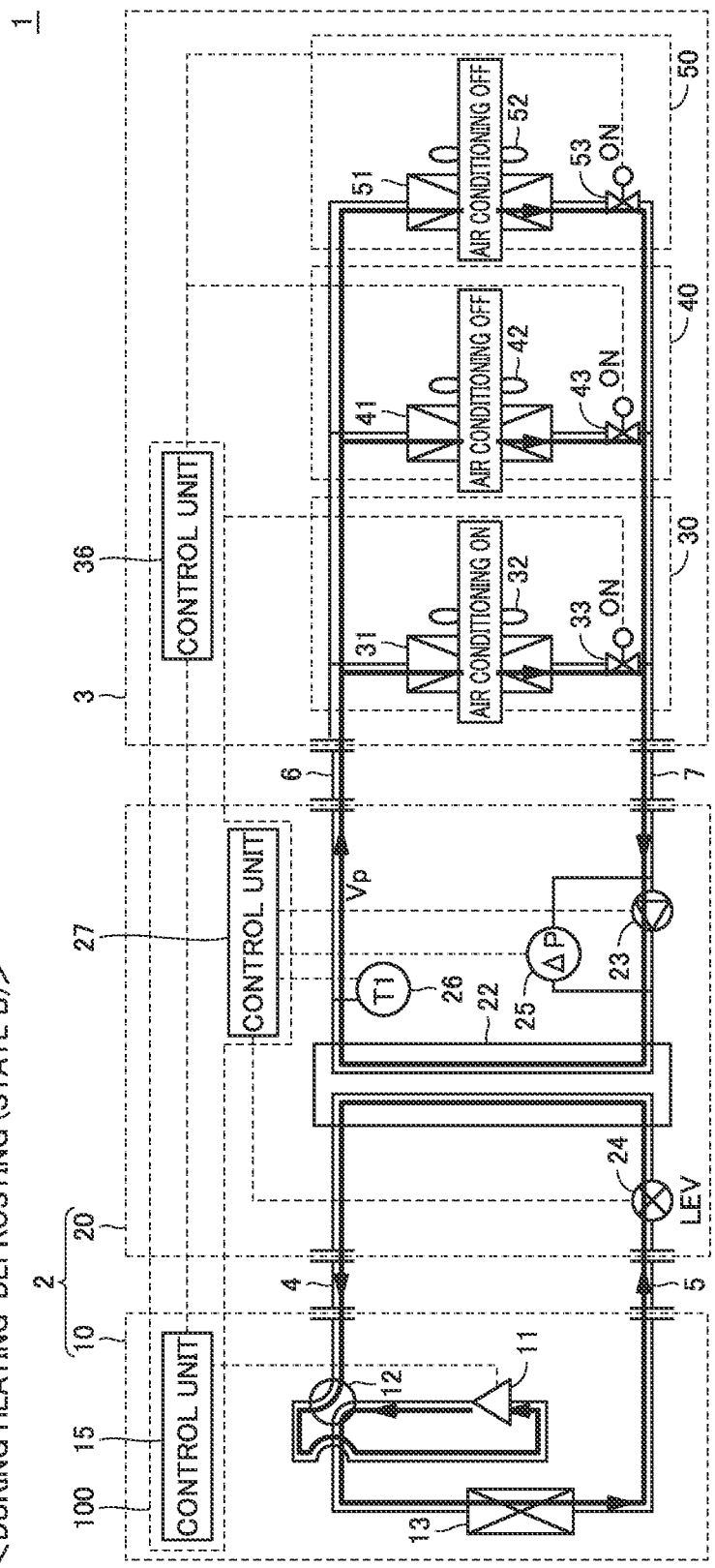
FIG. 4 shows flows of the first heat medium and the second heat medium in heating-defrosting operation (state B).

FIG. 4 shows flows of the first heat medium and the second heat medium in heating-defrosting operation (state B). The heating-defrosting operation (state B) is a state where the temperature of the second heat medium has decreased during the defrosting operation. FIG. 4 is different from FIG. 3 in that, during the heating-defrosting operation, the second heat medium is also flowed through the heat exchanges in the air-conditioning OFF state, to absorb heat from the air in rooms in which the indoor units in the air-conditioning OFF state are installed. A path of circulation of the first heat medium is the same as that of FIG. 3. Thus, the second heat medium circuit in FIG. 4 is described.

Referring to FIG. 4, in the second heat medium circuit, the second heat medium (water or brine) delivered from pump 23 exchanges heat with the first heat medium at second heat exchanger 22 and thereby decreases in temperature. The second heat medium having the reduced temperature is supplied to indoor unit 30 in the air-conditioning ON state. However, fan 32 is in a stopped state, and therefore, cold air is not blown into the room.

In addition, the temperature of the second heat medium is monitored by temperature sensor 26. When the temperature of the second heat medium reaches a first determination temperature X° C. close to a freezing temperature, the setting of flow rate control valves 43 and 53 corresponding to indoor units 40 and 50 in the air-conditioning OFF state is changed from the closed state to the open state. Fans 42 and 52 are also simultaneously driven, to actively perform heat exchange between the indoor air and the second heat medium at heat exchangers 41 and 51. As a result, the second heat medium increases in temperature, and is thus prevented from freezing. Therefore, the freezing at second heat exchanger 22 is prevented, and the defrosting operation does not need to be interrupted, leading to a shortened defrosting time.

When the temperature of the second heat medium that has decreased once increases to a second determination temperature Y° C., the path of circulation of the second heat medium is set again as in FIG. 3, and the defrosting operation is continued. Note that second determination temperature Y° C. may be any temperature higher than or equal to first determination temperature X° C. While second determination temperature Y° C. may be the same temperature as first determination temperature X° C., it is preferred to set Y>X to avoid frequent occurrence of switching of the flow path.

Figure 5:
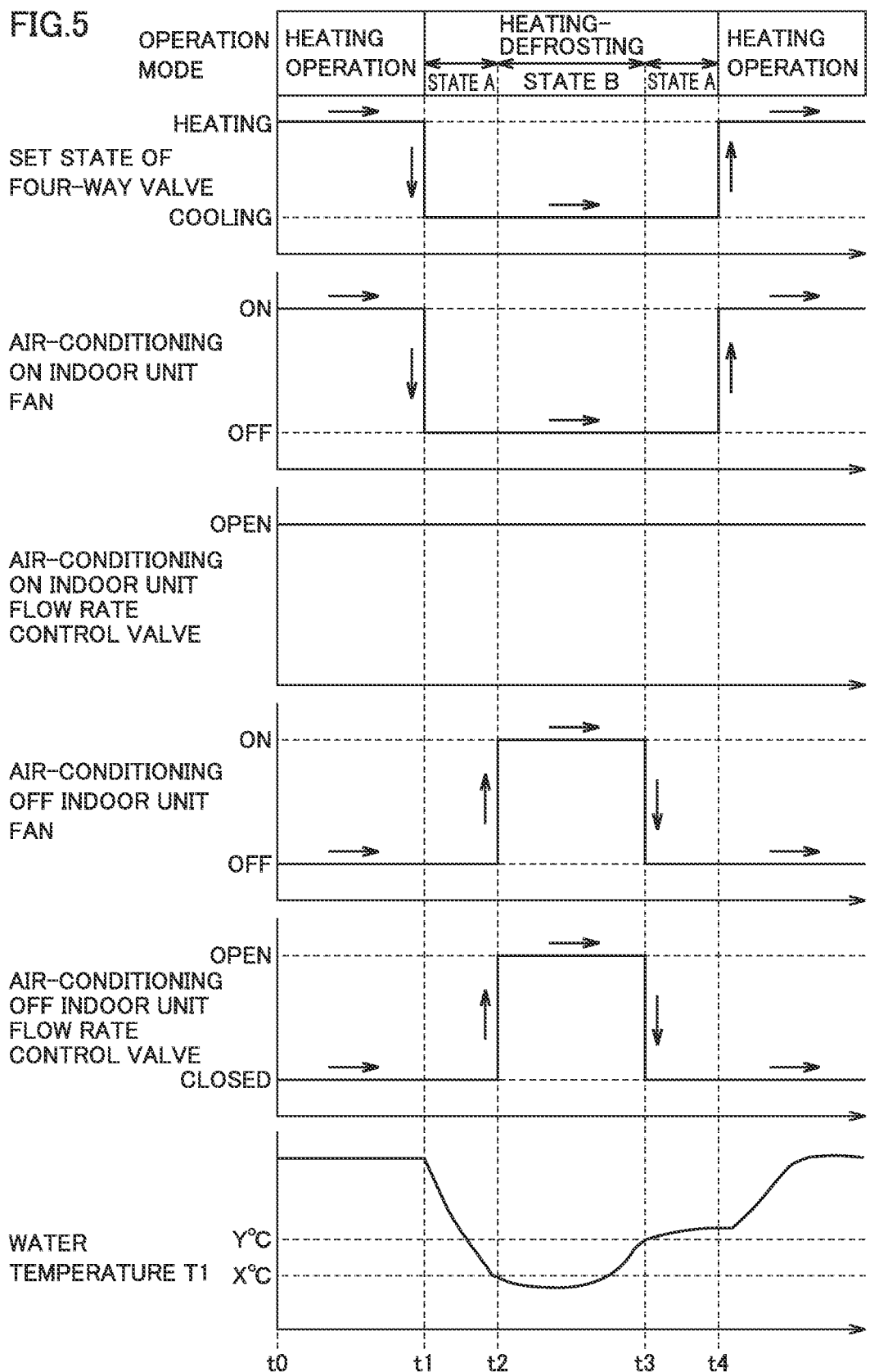
FIG. 5 shows waveform diagrams for illustrating exemplary control of the heating-defrosting operation in the first embodiment.

FIG. 5 shows waveform diagrams for illustrating exemplary control of the heating-defrosting operation in the first embodiment. Between times t0 and t1 in FIG. 5, heating operation is performed, and the first heat medium and the second heat medium flow as shown in FIG. 2.

At time t1, in response to a heating-defrosting start condition being satisfied, the state of the four-way valve is set from a heating state to a cooling state. Between times t1 and t2, the first heat medium and the second heat medium flow as shown in state A of FIG. 3. The heat of the second heat medium is transferred to the first heat medium at second heat exchanger 22, causing the temperature of the second heat medium to decrease gradually, and fall below first determination temperature X° C. at time t2.

In response to this, between times t2 and t3, the flow of the second heat medium is changed such that the second heat medium also flows through the air-conditioning OFF indoor units as shown in state B of FIG. 4. The indoor air and the second heat medium thereby exchange a greater amount of heat with each other, causing the temperature of the second heat medium to increase gradually.

When the temperature of the second heat medium becomes higher than second determination temperature Y° C. at time t3, the settings of the flow rate control valves are changed again as shown in FIG. 3. Then, when a defrosting operation stop condition is satisfied at time t4, a return is made again to the heating operation as shown in FIG. 2.

Figure 6:
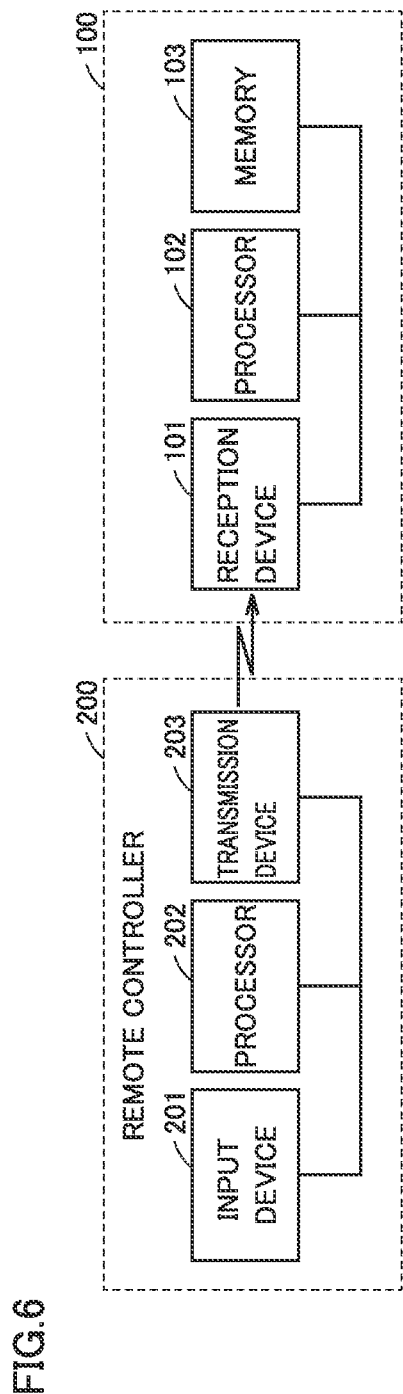
FIG. 6 shows the configuration of a controller for controlling the air conditioning apparatus and of a remote controller for remotely controlling the controller.

FIG. 6 shows the configuration of the controller for controlling the air conditioning apparatus and of a remote controller for remotely controlling the controller. Referring to FIG. 6, a remote controller 200 includes an input device 201, a processor 202, and a transmission device 203. Input device 201 includes a push button to switch between ON/OFF of the indoor unit by a user, a button to enter a set temperature, and the like. Transmission device 203 is for communicating with controller 100. Processor 202 controls transmission device 203 in accordance with an input signal provided from input device 201.

Controller 100 includes a reception device 101, a processor 102, and a memory 103.

Memory 103 includes, for example, a read only memory (ROM), a random access memory (RAM), and a flash memory. Note that the flash memory stores an operating system, an application program, and various types of data.

Processor 102 controls overall operation of air conditioning apparatus 1. Controller 100 shown in FIG. 1 is implemented by processor 102 executing the operating system and the application program stored in memory 103. The various types of data stored in memory 103 are referred to during the execution of the application program. Reception device 101 is for communicating with remote controller 200. When there are a plurality of indoor units, reception device 101 is provided in each of the plurality of indoor units.

When the controller is divided into a plurality of control units as shown in FIG. 1, the processor is included in each of the plurality of control units. In such a case, the plurality of processors cooperate with one another to perform overall control of air conditioning apparatus 1.

Figure 7:
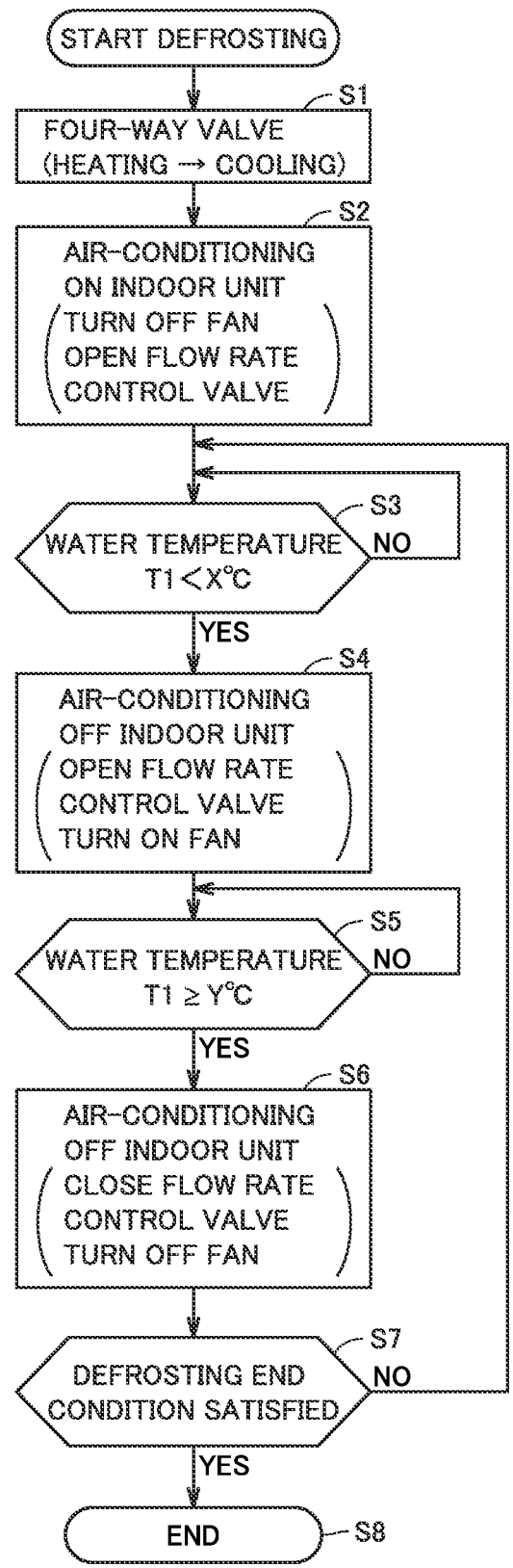
FIG. 7 is a flowchart for illustrating control performed by the controller in the first embodiment.

FIG. 7 is a flowchart for illustrating control performed by the controller in the first embodiment. Referring to FIG. 7, defrosting operation is started when a predetermined defrosting start condition is satisfied. The defrosting start condition is satisfied, for example, each time a certain time period elapses, or when the formation of frost on the heat exchanger of the outdoor unit is detected, during heating operation.

When the defrosting operation is started, first in step S1, controller 100 switches four-way valve 12 from a heating operation state to a cooling operation state. Subsequently, in step S2, controller 100 controls an indoor unit in the air-conditioning ON state such that its fan is turned off and its flow rate control valve is opened. This causes the second heat medium to flow as shown in state A of FIG. 3, for example.

In this state, in step S3, controller 100 determines whether or not a temperature T1 of the second heat medium detected at temperature sensor 26 is lower than first determination temperature X° C. When temperature T1 is higher than or equal to first determination temperature X° C. (NO in S3), state A of the defrosting operation shown in FIG. 3 is maintained. When temperature is lower than first determination temperature X° C. (YES in S3), on the other hand, the process proceeds to step S4.

In step S4, controller 100 controls indoor units in the air-conditioning OFF state such that their flow rate control valves are opened and their fans are turned on. This causes the second heat medium to flow as shown in state B of FIG. 4, for example.

In this state, in step S5, controller 100 determines whether or not temperature T1 of the second heat medium detected at temperature sensor 26 is higher than or equal to second determination temperature Y° C. When temperature T1 is lower than second determination temperature Y° C. (NO in S5), state B of the defrosting operation shown in FIG. 4 is maintained. When temperature T1 is higher than or equal to second determination temperature Y° C. (YES in S5), on the other hand, the process proceeds to step S6.

In step S6, controller 100 controls the indoor units in the air-conditioning OFF state such that their flow rate control valves are closed arid their fans are turned off. This causes the flow of the second heat medium to return to original state A as shown in FIG. 3.

In subsequent step S7, controller 100 determines whether or not a defrosting end condition is satisfied. The defrosting end condition is satisfied, for example, when a certain time period has elapsed since the start of the defrosting, or when the defrosting of the outdoor unit is completed. When the defrosting end condition is not satisfied in step S7, the processes of step S3 and the subsequent steps are repeated again. When the defrosting end condition is satisfied in step S7, on the other hand, the defrosting operation ends in step S8, and the heating operation is performed again.

Referring back to FIG. 1, the configuration and main operation of the air conditioning apparatus and the controller in the first embodiment are described. Controller 100 is a controller to control air conditioning apparatus 1 that operates in operation modes including a heating mode and a defrosting mode. Air conditioning apparatus 1 includes compressor 11 to compress the first heat medium, first heat exchanger 13 to exchange heat between the first heat medium and outdoor air, second heat exchanger 22 to exchange heat between the first heat medium and the second heat medium, the plurality of third heat exchangers 31, 41 and 51 to exchange heat between the second heat medium and indoor air, the plurality of flow rate control valves 33, 43 and 53 to control the flow rates of the second heat medium flowing through the plurality of third heat exchangers 31, 41 and 51, respectively, and pump 23 to circulate the second heat medium between the plurality of third heat exchangers 31, 41, 51 and second heat exchanger 22.

In the heating mode, controller 100 opens the flow rate control valve corresponding to a heat exchanger, of the plurality of third heat exchangers 31, 41 and 51, to which a request for air conditioning has been made, and closes the flow rate control valves corresponding to heat exchangers, of the plurality of third heat exchangers 31, 41 and 51, to which the request for air conditioning has not been made. In the defrosting mode, when temperature T1 of the second heat medium is lower than first determination temperature X° C., controller 100 opens at least one of the flow rate control valves corresponding to the heat exchangers to which the request for air conditioning has not been made.

Preferably, in the defrosting mode, when temperature T1 of the second heat medium is higher than second determination temperature Y° C., controller 100 closes the flow rate control valves corresponding to the heat exchangers to which the request for air conditioning has not been made.

In this manner, when the temperature of the second heat medium decreases during the defrosting operation, the second heat medium is flowed through the heat exchangers to which the request for air conditioning has not been made. This allows heat transfer from the indoor air to the second heat medium, thus increasing the temperature of the second heat medium.

Preferably, air conditioning apparatus 1 further includes the plurality of fans 32, 42 and 52 provided to correspond to the plurality of third heat exchangers 31, 41 and 51, respectively. In the heating mode, controller 100 drives the fan corresponding to the heat exchanger to which the request for air conditioning has been made, and stops the fan(s) corresponding to the heat exchanger(s) to which the request for air conditioning has not been made. In the defrosting mode, when the temperature of the second heat medium is lower than first determination temperature X° C., controller 100 drives the fans corresponding to the heat exchangers to which the request for air conditioning has not been made.

Preferably, in the defrosting mode, when the temperature of the second heat medium is higher than second determination temperature Y° C., controller 100 stops the fans corresponding to the heat exchangers to which the request for air conditioning has not been made.

In this manner, when the temperature of the second heat medium decreases during the defrosting operation, air is blown by the fans into the heat exchangers to Which the request for air conditioning has not been made. This further facilitates the heat transfer from the indoor air to the second heat medium.

As described above, when the second heat medium it likely to freeze during the heating-defrosting, the air conditioning apparatus in the first embodiment opens the flow rate control valves and rotates the fans in the indoor units in the air-conditioning OFF state, to increase the temperature of the second heat medium by indoor heat. Accordingly, heat absorption at the second heat exchanger can be ensured while the freezing at the second heat medium circuit is prevented, leading to a shortened length of time required for the defrosting operation.

Modification of First Embodiment

While the first embodiment has described performing defrosting during heating operation, it may also be possible that the second heat medium decreases in temperature and freezes during cooling operation. In a computer server room or a low-temperature warehouse, for example, cooling is performed even at a very low room temperature, which may cause the temperature of the second heat medium to decrease to a temperature close to the freezing temperature.

A modification of the first embodiment describes control of performing heat exchange with indoor air in the indoor units in the air-conditioning OFF state, when the second heat medium is likely to freeze during cooling operation.

In this modification, the process of step S1 in FIG. 7 is not performed because the cooling is being performed. In addition, in the indoor unit in the air-conditioning ON state, cold air may be blown, and therefore, the flow rate control valve is opened and the fan is turned on instead of the process of step S2. Furthermore, while steps S2 through S7 in FIG. 7 are performed, the following operation is performed instead of the process of step S4 when temperature T1 becomes lower than first determination temperature X° C.

First, as in the process of step S4, controller 100 opens the flow rate control valves and turns on the fans in the indoor units in the air-conditioning OFF state. Furthermore, the controller increases a rotation speed of the fan of the indoor unit in the air-conditioning ON state (which is performing cooling). As a result, when the temperature of the second heat medium decreases during the cooling operation, heat absorption from the indoor air is performed in the indoor unit in the air-conditioning ON state in addition to the indoor units in the air-conditioning OFF state. In the indoor unit in the air-conditioning ON state, the increased rotation speed of the fan leads to an increased amount of heat exchange. During the cooling, there is no problem with cold air being blown from the indoor unit in the air-conditioning ON state. Unlike step S4 in FIG. 7, therefore, the fan is turned on in the indoor unit in the air-conditioning ON state in the modification.

In the modification of the first embodiment, the operation modes further include a cooling mode in addition to the heating mode and the defrosting mode. In the cooling mode, when the temperature of the second heat medium is higher than second determination temperature Y° C., controller 100 closes the flow rate control valve(s) corresponding to the heat exchanger(s) to which the request for air conditioning has not been made, and when the temperature of the second heat medium is lower than first determination temperature X° C., controller 100 opens the flow rate control valve(s) corresponding to the heat exchanger(s) to which the request for air conditioning has not been made.

As described in the first embodiment, in the defrosting mode, controller 100 stops the fan corresponding to the heat exchanger to which the request for air conditioning has been made. In addition, in the cooling mode, when the temperature of the second heat medium varies from a temperature higher than first determination temperature X° C. to a temperature lower than first determination temperature X° C., controller 100 increases the rotation speed of the fan corresponding to the heat exchanger to which the request for air conditioning has been made.

With such control, it is possible to increase the temperature of the second heat medium even during the cooling operation, thereby preventing the freezing.

In the cooling mode, when the temperature of the second heat medium varies from a temperature lower than first determination temperature X° C. to a temperature higher than second determination temperature Y° C., controller 100 reduces the rotation speed of the fan corresponding to the heat exchanger to which the request for air conditioning has been made.

With such control, excessive cooling of the room is avoided during the cooling operation.

Second Embodiment

The indoor units in the air-conditioning OFF state are collectively handled in the first embodiment, Whereas in a second embodiment, heat is obtained from a number of indoor units suitable for required heat in defrosting operation.

Figure 8:
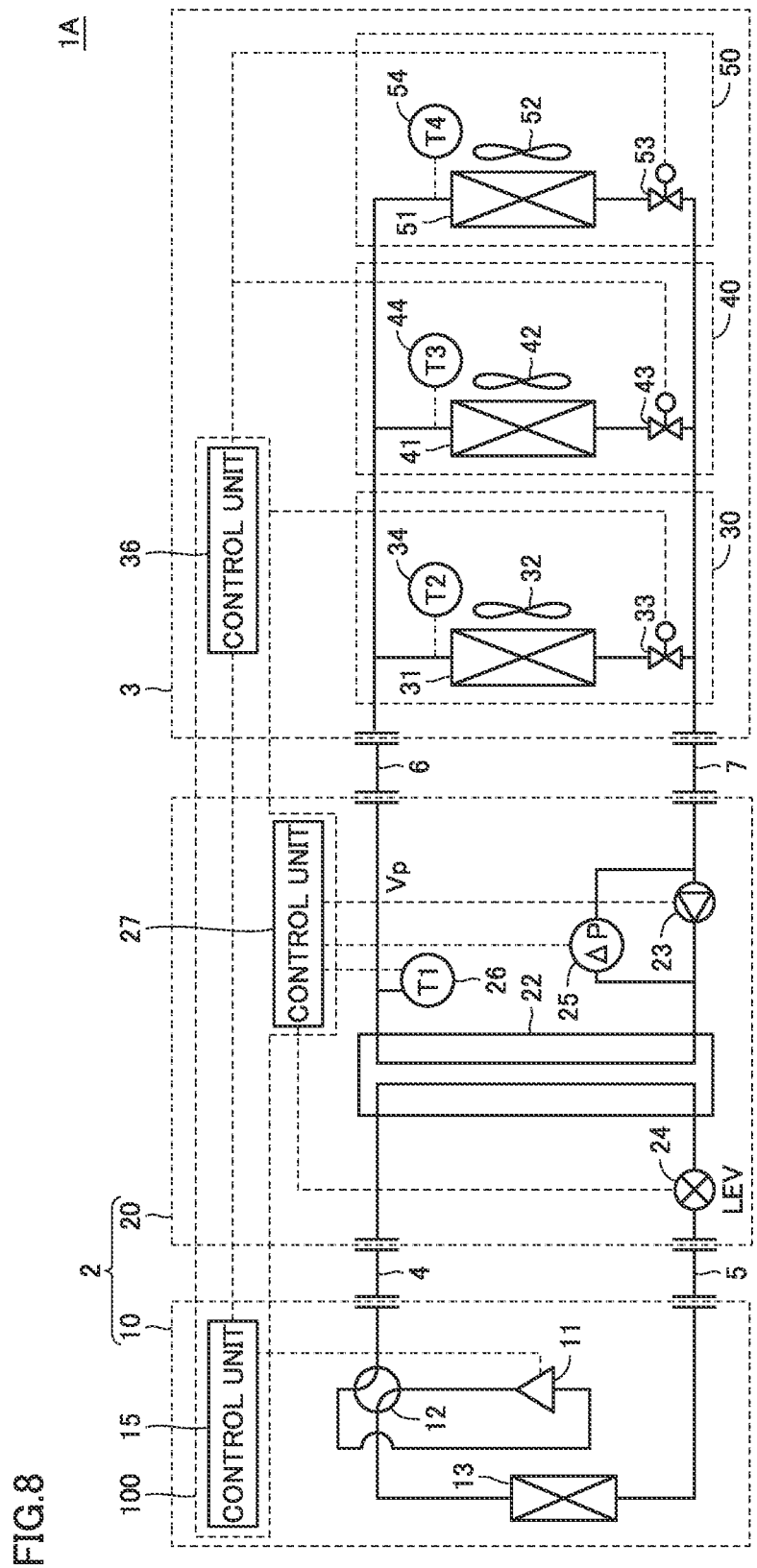
FIG. 8 shows the configuration of an air conditioning apparatus 1A in a second embodiment.

FIG. 8 shows the configuration of an air conditioning apparatus 1A in the second embodiment. In air conditioning apparatus 1A shown in FIG. 8, in addition to the configuration of air conditioning apparatus 1 shown in FIG. 1, indoor units 30, 40 and 50 include temperature sensors 34, 44 and 54, respectively. The configuration of air conditioning apparatus 1A is otherwise similar to that of air conditioning apparatus 1 shown in FIG. 1, and is not described repeatedly.

Temperature sensors 34, 44 and 54 measure temperatures T2, T3 and T4 of the second heat medium flowing into the indoor units, respectively, and output the temperatures to controller 100.

When the second heat medium is likely to freeze, controller 100 performs freezing-preventing operation of opening the flow rate control valve and turning on the indoor fan, preferentially from an indoor unit having a shorter length of a water pipe of the indoor units in the air-conditioning OFF state.

Figure 9:
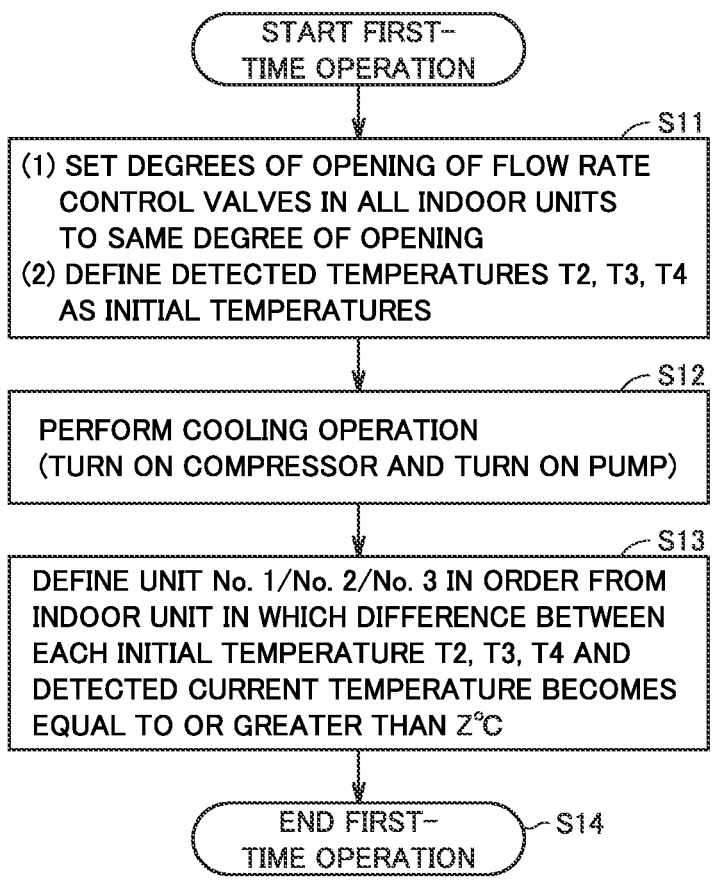
FIG. 9 is a flowchart for illustrating control performed during first-time operation in the second embodiment.

FIG. 9 is a flowchart for illustrating control performed during first-time operation in the second embodiment. Referring to FIGS. 8 and 9, the first-time operation is started when an operation command is entered for the first time after installation. In step S11, controller 100 sets degrees of opening of the flow rate control valves in all of the indoor units to the same degree of opening, and defines temperatures T2, T3 and T4 detected respectively by temperature sensors 34, 44 and 54 as initial temperatures and stores them in the memory.

Subsequently, in step S12, controller 100 performs cooling operation as the first-time operation by turning on compressor 11 and turning on pump 23. Then, in step S13, controller 100 defines unit numbers of the indoor units as No. 1/No. 2/No. 3 in the order from an indoor unit in which the difference between the above-described initial temperature and the detected current temperature becomes equal to or greater than Z° C., and stores them in the memory. Then, in step S14, controller 100 ends the cooling operation.

By performing this first-time operation, the unit numbers are assigned to the indoor units in the order from an indoor unit having a shorter length of the pipe for supplying the second heat medium.

Figure 10:
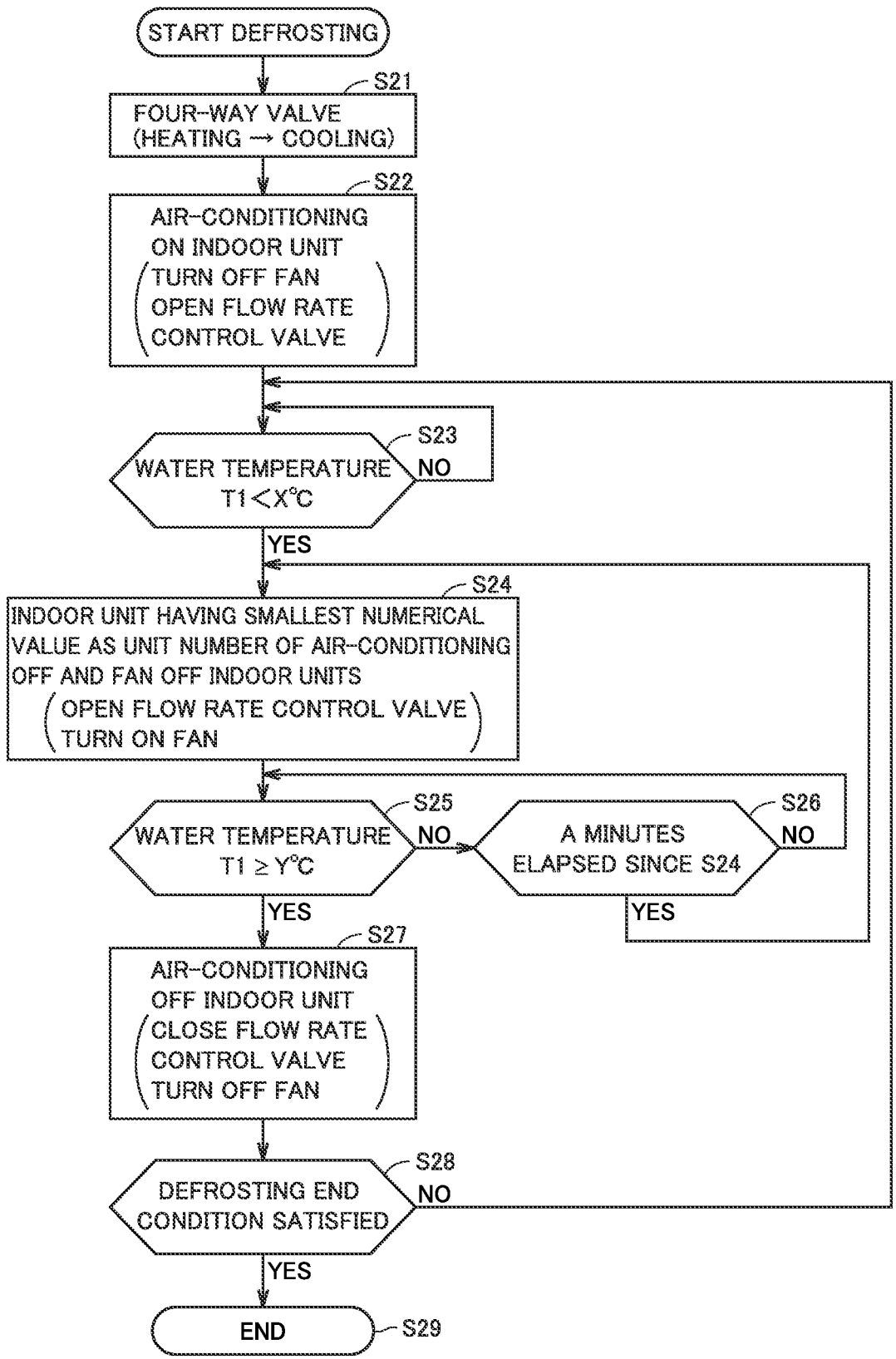
FIG. 10 is a flowchart for illustrating control performed during defrosting operation in the second embodiment.

FIG. 10 is a flowchart for illustrating control performed during defrosting operation in the second embodiment. Referring to FIG. 10, the defrosting operation is started when a predetermined defrosting start condition is satisfied. The defrosting start condition is satisfied, for example, each time a certain time period elapses, or When the formation of frost on the heat exchanger of the outdoor unit is detected, during heating operation.

When the defrosting operation is started, first in step S21, controller 100 switches four-way valve 12 from a heating operation state to a cooling operation state. Subsequently, in step S22, controller 100 controls an indoor unit in the air-conditioning ON state such that its fan is turned off and its flow rate control valve is opened. This causes the second heat medium to flow as shown in FIG. 3, for example.

In this state, in step S23, controller 100 determines whether or not temperature T1 of the second heat medium detected at temperature sensor 26 is lower than first determination temperature X° C. When temperature T1 is higher than or equal to first determination temperature X° C. (NO in S23), the state of the defrosting operation shown in FIG. 3 is maintained. When temperature T1 is lower than first determination temperature X° C. (YES in S23), on the other hand, the process proceeds to step S24.

In step S24, controller 100 controls an indoor unit having the smallest numerical value as the unit number, of the air-conditioning OFF and fan OFF indoor units, such that its flow rate control valve is opened and its fan is turned on.

Furthermore, in step S25, controller 100 determines whether or not temperature T1 of the second heat medium detected at temperature sensor 26 is higher than or equal to second determination temperature Y° C.

When temperature T1 is lower than second determination temperature Y° C. in step S25 (NO in S25), the initial state of the defrosting operation shown in FIG. 4 is maintained. Then in step S26, it is determined whether or not a time period A minute(s) have elapsed since the execution of the process of step S24. When A minute(s) have not yet elapsed in step S26 (NO in S26), the determination process of step S25 is performed again. When A minute(s) have elapsed in step S26 (YES in S26), the process proceeds to step S24. In step S24, the indoor unit in the air-conditioning OFF state whose fan was turned on the previous time is removed, and therefore, controller 100 controls an indoor unit having the next smallest unit number such that its flow rate control valve is opened and its fan is turned on.

When temperature T1 is higher than or equal to second determination temperature Y° C. (YES in S25), on the other hand, the process proceeds to step S27.

In step S27, controller 100 controls the indoor units in the air-conditioning OFF state such that their flow rate control valves are closed and their fans are turned off. This causes the flow of the second heat medium to return to the original state as shown in FIG. 3.

In subsequent step S28, controller 100 determines whether or not a defrosting end condition is satisfied. The defrosting end condition is satisfied, for example, when a certain time period has elapsed since the start of the defrosting, or when the defrosting of the outdoor unit is completed. When the defrosting end condition is not satisfied in step S28, the processes of step S23 and the subsequent steps are repeated again. When the defrosting end condition is satisfied in step S28, on the other hand, the defrosting operation ends in step S29, and the heating operation is performed again.

As described above, when the temperature of the second heat medium is lower than first determination temperature X° C., controller 100 opens one of the flow rate control valves corresponding to the heat exchangers to which the request for air conditioning has not been made, and when the temperature of the second heat medium is still lower than first determination temperature X° C. after the one of the flow rate control valves is opened, controller 100 opens another one of the flow rate control valves corresponding to the heat exchangers to which the request for air conditioning has not been made.

With such control, in the air conditioning apparatus of the second embodiment, when the temperature of the second heat medium decreases during the defrosting operation, the fan(s) are turned on and the flow rate control valve(s) are opened in a minimum number of indoor units of the indoor units in the air-conditioning OFF state, to increase the temperature of the second heat medium. This can reduce power consumption during the defrosting operation as compared to that in the first embodiment, and can eliminate the need to reduce the temperature of an indoor unit in the air-conditioning OFF state whose temperature need not be reduced, and is therefore advantageous for when the indoor unit in the air-conditioning OFF state starts heating.

Third Embodiment

While the indoor units in the air-conditioning OFF state are collectively handled in the first embodiment, blowing of cold air from the indoor unit in a room having a room temperature lower than a heating set temperature may cause an occupant in the room to feel uncomfortable. In a third embodiment, in defrosting operation, an indoor unit from which heat is to be obtained is determined in consideration of room temperatures of spaces where the indoor units in the air-conditioning OFF state are installed.

Figure 11:
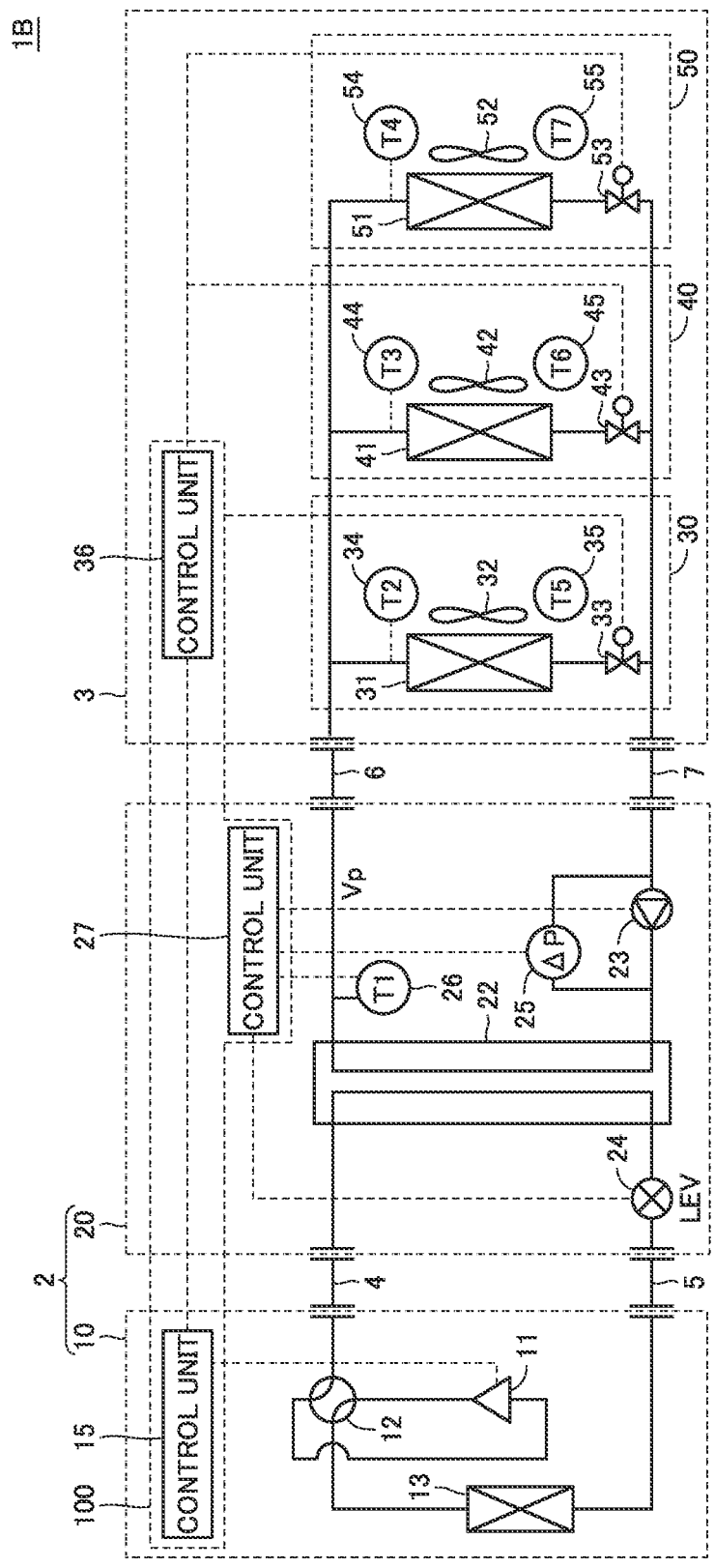
FIG. 11 shows the configuration of an air conditioning apparatus 1B in a third embodiment.

FIG. 11 shows the configuration of an air conditioning apparatus 1B in the third embodiment. In air conditioning apparatus 1B shown in FIG. 11, in addition to the configuration of air conditioning apparatus 1A shown in FIG. 8, indoor units 30, 40 and 50 include temperature sensors 35, 45 and 55 for sensing room temperatures, respectively. The configuration of air conditioning apparatus 1B is otherwise similar to that of air conditioning apparatus 1A shown in FIG. 8, and is not described repeatedly.

Temperature sensors 35, 45 and 55 measure temperatures T5, T6 and T7 of rooms in which indoor units 30, 40 and 50 are installed, and output the temperatures to controller 100.

Figure 12:
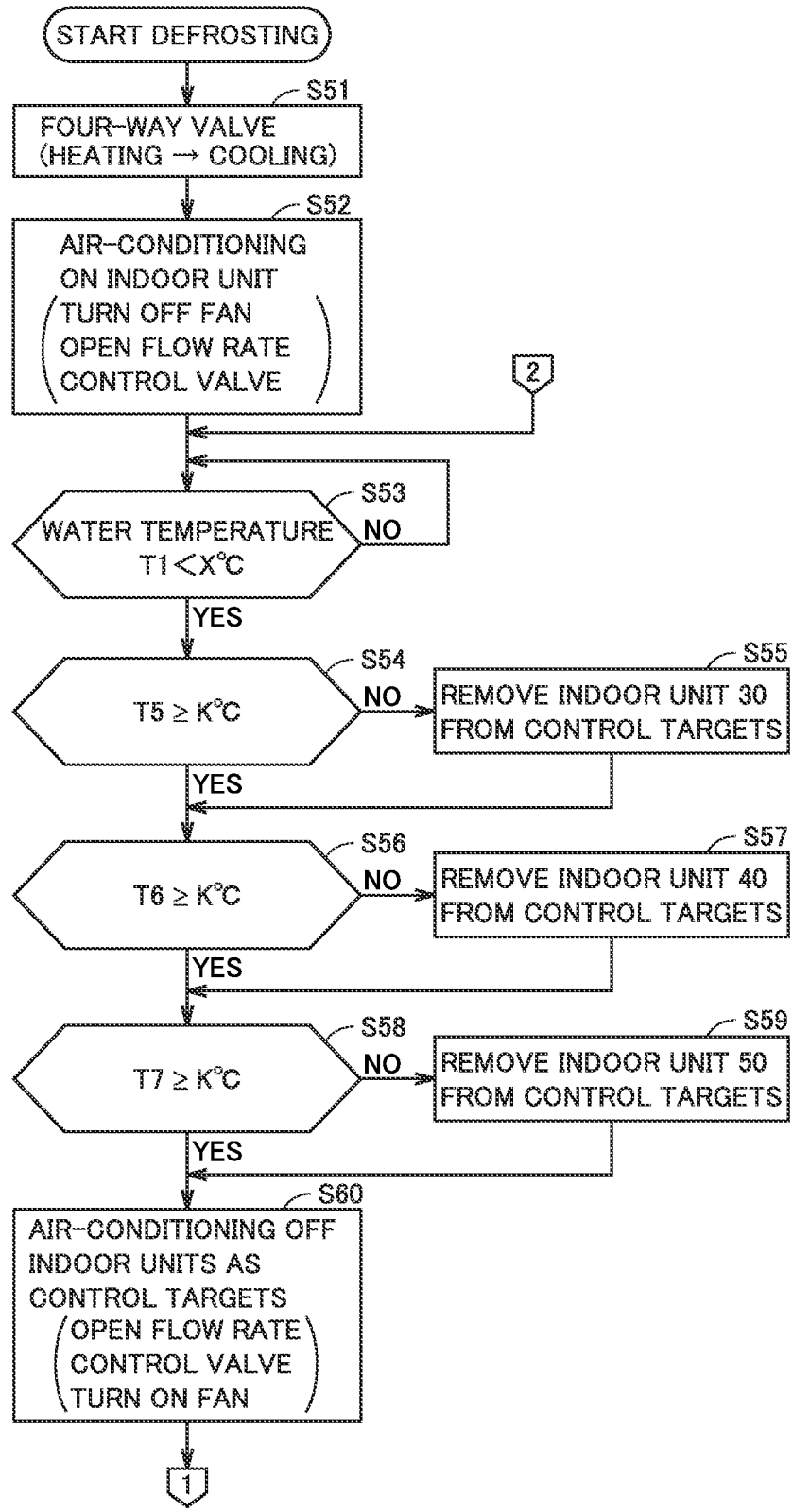
FIG. 12 is a flowchart (first half) for illustrating control performed during defrosting operation in the third embodiment.

FIG. 12 is a flowchart (first half) for illustrating control performed during defrosting operation in the third embodiment. Referring to FIGS. 11 and 12, the defrosting operation is started when a predetermined defrosting start condition is satisfied. The defrosting start condition is satisfied, for example, each time a certain time period elapses, or when the formation of frost on the heat exchanger of the outdoor unit is detected, during heating operation.

When the defrosting operation is started, first in step S51, controller 100 switches four-way valve 12 from a heating operation state to a cooling operation state. Subsequently, in step S52, controller 100 controls an indoor unit in the air-conditioning ON state such that its fan is turned off and its flow rate control valve is opened. This causes the second heat medium to flow as shown in FIG. 3, for example.

In this state, in step S53, controller 100 determines whether or not temperature T1 of the second heat medium detected at temperature sensor 26 is lower than first determination temperature X° C. When temperature T1 is higher than or equal to first determination temperature X° C. (NO in S53), the state of the defrosting operation shown in FIG. 3 is maintained. When temperature T1 is lower than first determination temperature X° C. (YES in S53), on the other hand, the process proceeds to step S54.

In step S54, controller 100 measures temperature T5 of the room in which indoor unit 30 is installed using temperature sensor 35, and determines whether or not temperature T5 is higher than or equal to a third determination temperature K° C. When temperature T5 is lower than determination temperature K° C. (NO in S54), in step S55, controller 100 removes indoor unit 30 from control targets through which the second heat medium is flowed to absorb heat from the indoor air, and proceeds the process to step S56. When temperature T5 is higher than or equal to determination temperature K° C. (YES in S54), on the other hand, controller 100 proceeds the process to step S56 without performing the process of step S55.

In step S56, controller 100 measures temperature T6 of the room in which indoor unit 40 is installed using temperature sensor 45, and determines whether or not temperature T6 is higher than or equal to third determination temperature K° C. When temperature T6 is lower than determination temperature K° C. (NO in S56), in step S57, controller 100 removes indoor unit 40 from the control targets through which the second heat medium is flowed to absorb heat from the indoor air, and proceeds the process to step S58. When temperature T6 is higher than or equal to determination temperature K° C. (YES in S56), on the other hand, controller 100 proceeds the process to step S58 without performing the process of step S57.

In step S58, controller 100 measures temperature T7 of the room in which indoor unit 50 is installed using temperature sensor 55, and determines whether or not temperature T7 is higher than or equal to third determination temperature K° C. When temperature T7 is lower than determination temperature K° C. (NO in S58), in step S59, controller 100 removes indoor unit 50 from the control targets through which the second heat medium is flowed to absorb heat from the indoor air, and proceeds the process to step S60. When temperature T7 is higher than or equal to determination temperature K° C. (YES in S58), on the other hand, controller 100 proceeds the process to step S60 without performing the process of step S59.

In step S60, the flow rate control valve(s) are opened and the fan(s) are turned on, which correspond to the indoor unit(s) that were not removed from the control targets in the processes of steps S55, S57 and S59 of the indoor units in the air-conditioning OFF state.

Figure 13:
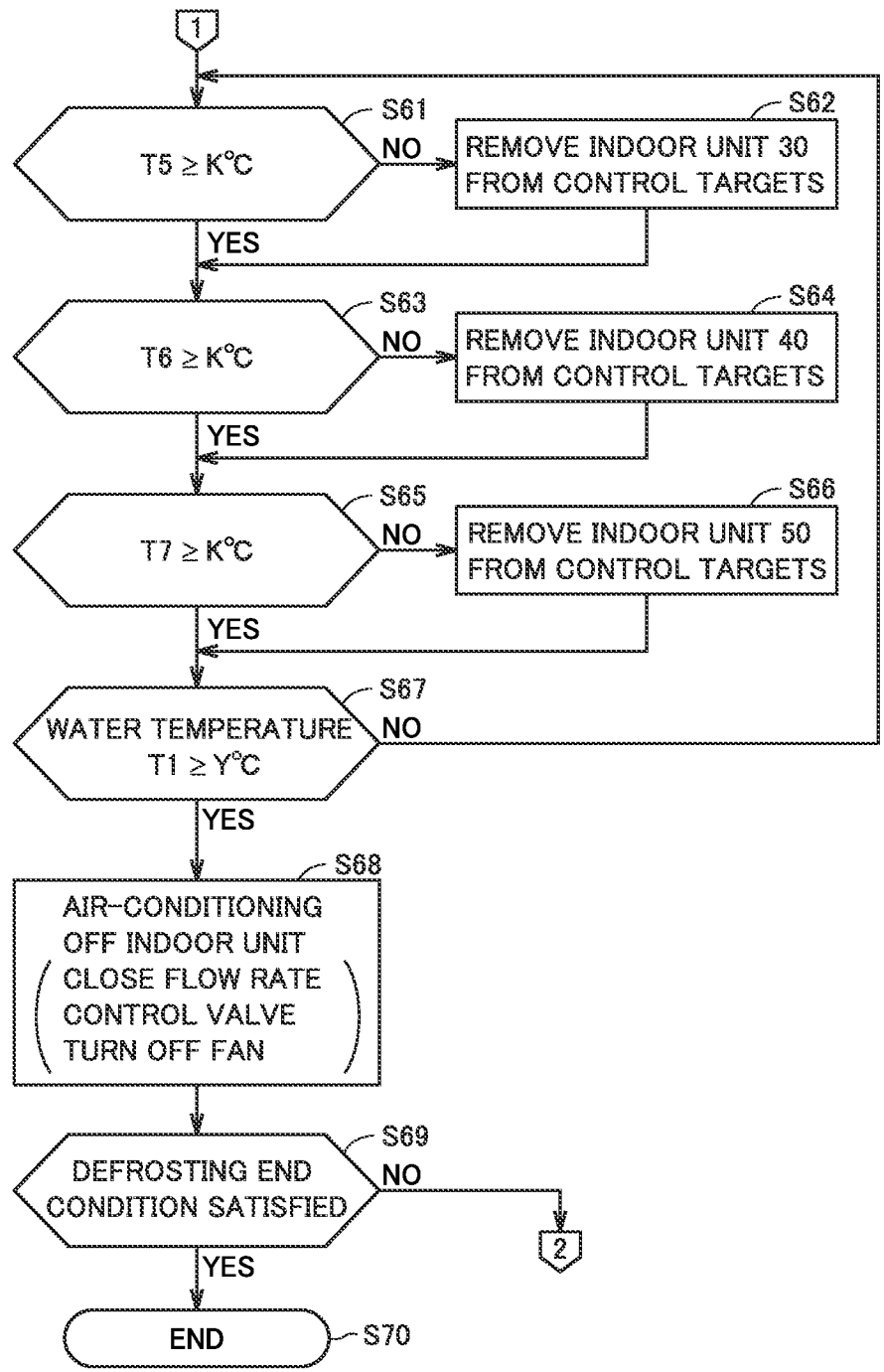
FIG. 13 is a flowchart (second half) for illustrating control performed during defrosting operation in the third embodiment.

FIG. 13 is a flowchart (second half) for illustrating control performed during defrosting operation in the third embodiment. Following step S60, processes of step S61 and the subsequent steps shown in FIG. 13 are performed.

In step S61, controller 100 measures temperature T5 of the room in Which indoor unit 30 is installed using temperature sensor 35, and determines whether or not temperature T5 is higher than or equal to third determination temperature K° C. When temperature T5 is lower than determination temperature K° C. (NO in S61), in step S62, controller 100 removes indoor unit 30 from the control targets in which heat is absorbed from the indoor air, by closing the corresponding flow rate control valve and turning off the corresponding fan, and proceeds the process to step S63. When temperature T5 is higher than or equal to determination temperature K° C. (YES in S61), on the other hand, controller 100 proceeds the process to step S63 without performing the process of step S62.

In step S63, controller 100 measures temperature T6 of the room in which indoor unit 40 is installed using temperature sensor 45, and determines whether or not temperature T6 is higher than or equal to third determination temperature K° C. When temperature T6 is lower than determination temperature K° C. (NO in S63), in step S64, controller 100 removes indoor unit 40 from the control targets in which heat is absorbed from the indoor air, by closing the corresponding flow rate control valve and turning off the corresponding fan, and proceeds the process to step S65. When temperature T6 is higher than or equal to determination temperature K° C. (YES in S63), on the other hand, controller 100 proceeds the process to step S65 without performing the process of step S64.

In step S65, controller 100 measures temperature T7 of the room in which indoor unit 50 is installed using temperature sensor 55, and determines whether or not temperature T7 is higher than or equal to third determination temperature K° C. When temperature T7 is lower than determination temperature K° C. (NO in S65), in step S66, controller 100 removes indoor unit 50 from the control targets in which heat is absorbed from the indoor air, by closing the corresponding flow rate control valve and turning off the corresponding fan, and proceeds the process to step S67. When temperature T7 is higher than or equal to determination temperature K° C. (YES in S65), on the other hand, controller 100 proceeds the process to step S67 without performing the process of step S66.

In step S67, controller 100 determines whether or not temperature T1 of the second heat medium detected at temperature sensor 26 is higher than or equal to second determination temperature Y° C.

When temperature T1 is lower than second determination temperature Y° C. in step S67 (NO in S67), the defrosting operation using the indoor unit(s) in the air-conditioning OFF state is continued, and in steps S61 through S66, the processes of monitoring the room temperatures, and the processes of preventing the second heat medium from flowing through the indoor unit(s) in the room(s) having the reduced room temperature are performed. When temperature T1 is higher than or equal to second determination temperature Y° C. (YES in S67), on the other hand, the process proceeds to step S68.

In step S68, controller 100 controls the indoor unit(s) in the air-conditioning OFF state such that their flow rate control valve(s) are closed and their fan(s) are turned off. This causes the flow of the second heat medium to return to the original state as shown in FIG. 3.

In subsequent step S69, controller 100 determines whether or not a defrosting end condition is satisfied. The defrosting end condition is satisfied, for example, when a certain time period has elapsed since the start of the defrosting, or when the defrosting of the outdoor unit is completed.

When the defrosting end condition is not satisfied in step S69, the processes of step S53 and the subsequent steps in FIG. 12 are repeated again. When the defrosting end condition is satisfied in step S69, on the other hand, the defrosting operation ends in step S70, and the heating operation is performed again.

As described above, when the temperature of the second heat medium is lower than first determination temperature X° C., controller 100 opens the flow rate control valve corresponding to a heat exchanger, of the heat exchangers to which the request for air conditioning has not been made, that is installed in a room having a temperature higher than third determination temperature K° C.

With such control, in the air conditioning apparatus of the third embodiment, when the temperature of the second heat medium decreases during the defrosting operation, the fan(s) are turned on and the flow rate control valve(s) are opened to increase the temperature of the second heat medium, while the indoor unit(s) installed in a room having a temperature lower than determination temperature K° C. of the indoor units in the air-conditioning OFF state are removed. This can prevent blowing of cold air from the indoor unit during the defrosting operation, which causes an occupant in the low-temperature room to feel uncomfortable.

Note that a main part of controller 100 may be disposed in any of outdoor unit 10, relay unit 20 and heat source unit 2. Air conditioning apparatuses 1, 1A and 1B in the present embodiment each include: the first heat medium circuit formed by compressor 11, first heat exchanger 13, and second heat exchanger 22; the second heat medium circuit formed by pump 23, second heat exchanger 22, and the plurality of third heat exchangers 31, 41 and 51; and controller 100.

It should be understood that the embodiments disclosed herein are illustrative and non-restrictive in every respect. The scope of the present disclosure is defined by the terms of the claims, rather than the description of the embodiments above, and is intended to include any modifications within the meaning and scope equivalent to the terms of the claims.

REFERENCE SIGNS LIST 1, 1A, 1B: air conditioning apparatus; 2: heat source unit; 3: indoor air conditioning device; 4, 5, 6, 7: pipe; 10: outdoor unit; 11: compressor; 12: four-way valve; 13, 22, 31, 41, 51: heat exchanger; 15, 27, 36: control unit; 20: relay unit; 23: pump; 24: expansion valve; 25: pressure sensor; 26, 34, 35, 44, 45, 54, 55: temperature sensor; 30, 40, 50: indoor unit; 32, 42, 52: fan; 33, 43, 53: flow rate control valve; 100: controller; 101: reception device; 102, 202: processor; 103: memory; 200: remote controller; 201: input device; 203: transmission device.

The invention claimed is:

1. A controller to control an air conditioning apparatus configured to operate in operation modes including a heating mode and a defrosting mode, the air conditioning apparatus comprising:
    a compressor configured to compress a first heat medium;
    a first heat exchanger configured to exchange heat between the first heat medium and outdoor air;
    a second heat exchanger configured to exchange heat between the first heat medium and a second heat medium;
    a plurality of third heat exchangers each configured to exchange heat between the second heat medium and indoor air;
    a plurality of flow rate control valves each configured to control a flow rate of the second heat medium flowing through a corresponding one of the plurality of third heat exchangers; and
    a pump configured to circulate the second heat medium between the plurality of third heat exchangers and the second heat exchanger, wherein
    in the heating mode, the controller is configured to open the flow rate control valve corresponding to a heat exchanger, of the plurality of third heat exchangers, to which a request for air conditioning has been made, and to close the flow rate control valve corresponding to a heat exchanger, of the plurality of third heat exchangers, to which the request for air conditioning has not been made, and
    in the defrosting mode, when a temperature of the second heat medium is lower than a first determination temperature, the controller is configured to open the flow rate control valve corresponding to the heat exchanger to which the request for air conditioning has not been made, wherein
    in the defrosting mode, when the temperature of the second heat medium is higher than a second determination temperature, the controller is configured to close the flow rate control valve corresponding to the heat exchanger to which the request for air conditioning has not been made, and
    the second determination temperature is a temperature higher than or equal to the first determination temperature.

2. The controller according to claim 1, wherein
the air conditioning apparatus further comprises a plurality of fans each provided for a corresponding one of the plurality of third heat exchangers,
    in the heating mode, the controller is configured to drive the fan corresponding to the heat exchanger to which the request for air conditioning has been made, and to stop the fan corresponding to the heat exchanger to which the request for air conditioning has not been made, and
    in the defrosting mode, when the temperature of the second heat medium is lower than the first determination temperature, the controller is configured to drive the fan corresponding to the heat exchanger to which the request for air conditioning has not been made.

3. The controller according to claim 2, wherein
    in the defrosting mode, when the temperature of the second heat medium is higher than a second determination temperature, the controller is configured to stop the fan corresponding to the heat exchanger to which the request for air conditioning has not been made, and
    the second determination temperature is a temperature higher than or equal to the first determination temperature.

4. The controller according to claim 1, wherein
the operation modes further include a cooling mode, and
    in the cooling mode, when the temperature of the second heat medium is higher than the second determination temperature, the controller is configured to close the flow rate control valve corresponding to the heat exchanger to which the request for air conditioning has not been made, and when the temperature of the second heat medium is lower than the first determination temperature, the controller is configured to open the flow rate control valve corresponding to the heat exchanger to which the request for air conditioning has not been made.

5. The controller according to claim 4, wherein in the defrosting mode, the controller is configured to stop the fan corresponding to the heat exchanger to which the request for air conditioning has been made, and in the cooling mode, when the temperature of the second heat medium varies from a temperature higher than the first determination temperature to a temperature lower than the first determination temperature, the controller is configured to increase a rotation speed of the fan corresponding to the heat exchanger to which the request for air conditioning has been made.

6. The controller according to claim 5, wherein in the cooling mode, when the temperature of the second heat medium varies from a temperature lower than the first determination temperature to a temperature higher than the second determination temperature, the controller is configured to reduce the rotation speed of the fan corresponding to the heat exchanger to which the request for air conditioning has been made.

7. The controller according to claim 1, wherein when the temperature of the second heat medium is lower than the first determination temperature, the controller is configured to open one of the flow rate control valves corresponding to the heat exchangers to which the request for air conditioning has not been made, and when the temperature of the second heat medium is still lower than the first determination temperature after the one of the flow rate control valves is opened, the controller is configured to open another one of the flow rate control valves corresponding to the heat exchangers to which the request for air conditioning has not been made.

8. The controller according to claim 1, wherein when the temperature of the second heat medium is lower than the first determination temperature, the controller is configured to open the flow rate control valve corresponding to a heat exchanger, of the heat exchangers to which the request for air conditioning has not been made, that is installed in a room having a temperature higher than a third determination temperature.

9. An outdoor unit comprising:
the compressor;
the first heat exchanger; and
the controller according to claim 1.

10. A relay unit comprising:
the second heat exchanger;
the pump; and
the controller according to claim 1.

11. A heat source unit comprising:
the compressor;
the first heat exchanger;
the second heat exchanger;
the pump; and
the controller according to claim 1.

12. An air conditioning apparatus comprising:
a first heat medium circuit formed by the compressor, the first heat exchanger, and the second heat exchanger;
a second heat medium circuit formed by the pump, the second heat exchanger, and the plurality of third heat exchangers; and
the controller according to claim 1.

* * * * *